United States Patent Office 2,833,268
Patented May 6, 1958

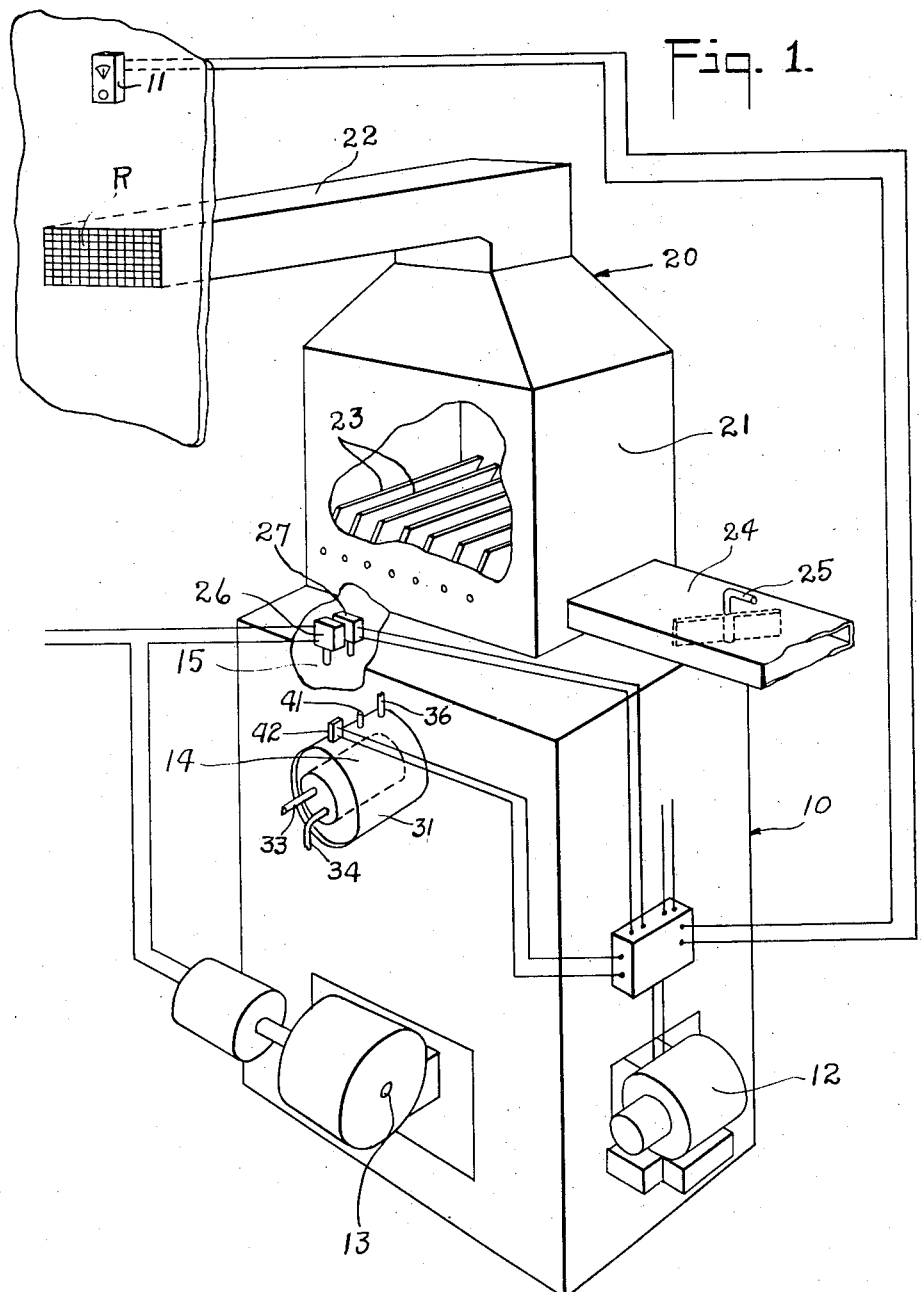

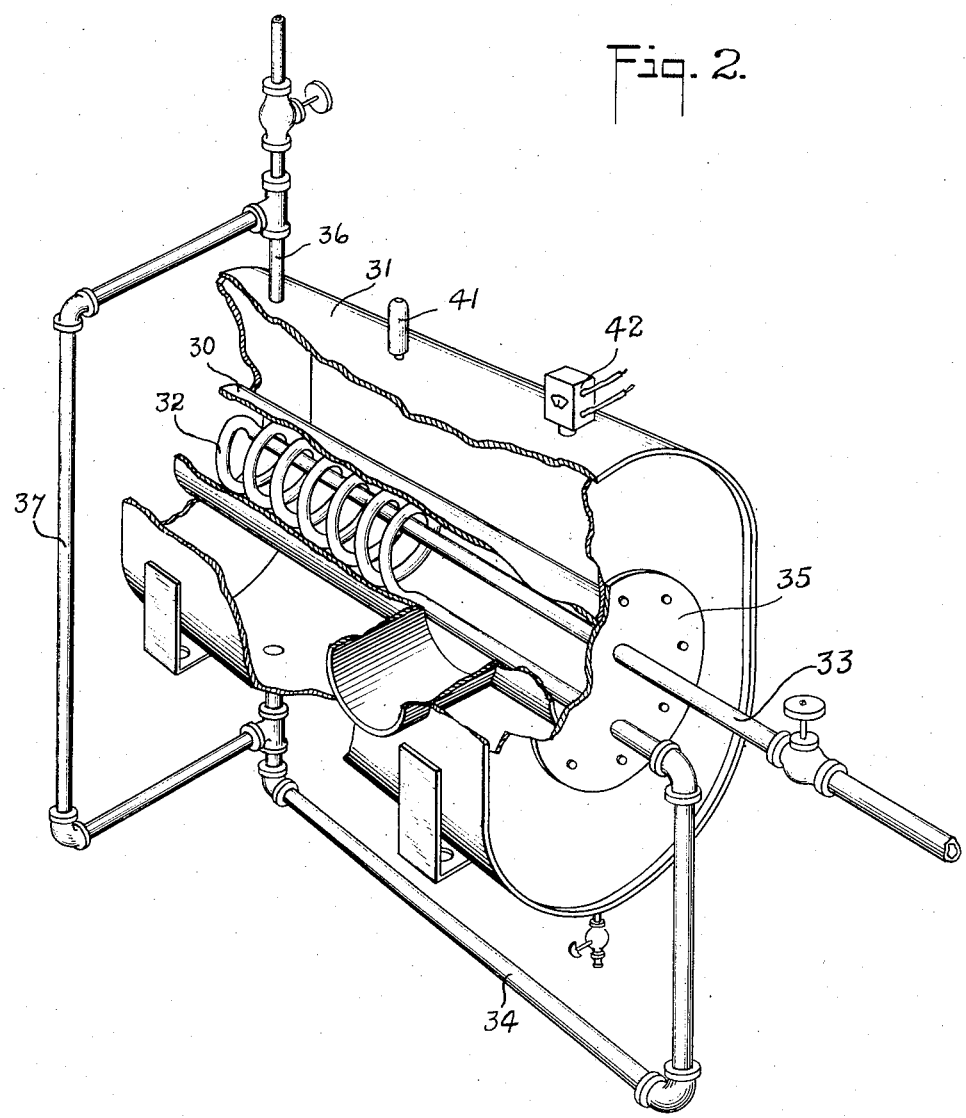

2,833,268

COMBINED AIR AND WATER HEATER

Albert E. Warren, Glen Cove, N. Y.

Application September 16, 1954, Serial No. 456,456

1 Claim. (Cl. 126—101)

My invention relates to a heating system, particularly to a system for heating (1) the space surrounding the system and (2) water.

The principal object of my invention is to avoid the waste that results from the usual operation of a hot air heating system for houses and the like, that is, the waste of heat that results when flue gases are substantially as hot when they leave the chimney of such a system as when they leave the furnace.

A secondary object is to avoid overheating the space surrounding the system.

My invention attains the principal object by providing a system that can be used to heat houses and the like in winter and to heat water throughout the year. The system has a furnace, a hot air duct system leading from the furnace to points throughout the house, a blower to force hot air throughout the house, and a gate or valve in the duct system which, when closed, prevents circulation. The system also has a hot water generator through which the flue gases flow. In winter, when both house and water need heating, the furnace begins to operate, the gate in the duct system opens, hot air circulates throughout the house, and flue gases heat the water. In summer, when only water needs heating, the system operates the same way except that the gate remains closed, preventing the circulation of hot air throughout the house.

My invention attains the secondary object by closing the gate in the hot air duct system at the same time the blower ceases to operate.

The preferred form is shown in the accompanying drawings to illustrate the invention. In these drawings:

Figure 1 is a perspective view of the part of the system comprising a furnace, a representative room to be heated, a representative hot air duct, and the gate or valve in the duct system; and Figure 2 is a perspective view of the hot water generator with the left end adjacent to the furnace.

In this illustration, as shown in Figure 1, a furnace 10 is equipped with a room thermostat 11 controlling it by opening and closing electrical contacts; a burner 12; a blower 13; a flue 14; and a bonnet 15. The bonnet 15 separates the furnace 10 from an air duct system 20, comprising a heating chamber 21 and a duct 22 terminating in a wall register R. Near the bottom of the heating chamber 21 are louvers 23 adapted to separate the portion below them from the portion above. The louvers 23 are normally closed. They are opened by a motor that maintains them in an open position when the blower 13 is operating. Communicating with the heating chamber 21 at a point below the louvers 23 is an air relief duct 24, equipped with a gate 25. The air relief duct 24 permits hot air to escape to the outside when the gate 25 is open. Mounted on the bonnet 15 and extending into the chamber 21 is a blower thermostat 26 and a burner thermostat 27. The blower thermostat 26 is set to operate the blower 13 by closing an electrical contact when the temperature in the lower part of the air chamber 21 rises to a selected temperature. The burner thermostat 27 has its contacts normally closed. They open when the temperature in the air chamber 21 rises to a selected temperature.

Turning to Figure 2, there is connected to the flue 14 a water heater, comprising a flue duct 30 and a reservoir 31 surrounding the flue duct 30. Within the flue duct 30 is a tubular coil 32 connected at its end adjacent to the furnace to a tube 33, and at its end remote from the furnace to a tube 34. Tube 33 is connected to a source of water to be heated. It extends from the coil 32 through the end wall of the water heater, emerging through an opening in the end wall large enough to permit entry for cleaning purposes. The opening is normally covered, except for the tube 33, by a removable plate 35. Tube 34 is connected to the reservoir 31 at the bottom of the reservoir 31. Issuing from the top of the reservoir 31 is a tube 36 leading to hot water lines throughout the house. Connected to the tubes 34 and 36 to by-pass the reservoir 31 and to provide for circulation during periods of no demand is a tube 37.

Mounted on the reservoir are a safety valve 41 and a reservoir thermostat 42. The reservoir thermostat 42 is set to turn the burner 12 on by closing contacts when the temperature of the water in the reservoir 31 falls to a selected temperature, and to turn it off by opening the contacts when the temperature rises to a selected temperature. The reservoir thermostat 42 is superseded by the room thermostat 11.

It should be noted that the thermostat 11, the burner 12, the blower 13, the blower thermostat 26 and the burner thermostat 27 are part of a conventional house heating system, in which the burner 12 and the blower 13 are connected to the house electrical system in parallel relation. In the conventional system the blower 13 is controlled by the blower thermostat 26 as described above, whereas the burner 12 is controlled by the burner thermostat 27 as described above, and the room thermostat 11 as described above. The wiring of my invention differs from the conventional system in the addition of the reservoir thermostat 42 which controls the burner in the same manner as the room thermostat 11 controls it. The superseding referred to above consists of wiring the two thermostats 11 and 42 in parallel so that the room thermostat 11 can energize the burner when the reservoir thermostat does not.

The operation of the system is as follows:

In the winter, when the temperature at the room thermostat 11 falls to a selected point, the electrical contacts of the thermostat 11 close, causing the burner 12 to operate. Gate 25 on the air relief duct 24 is closed and the air in the portion of the heating chamber 21 below the louvers 23 is heated. When the temperature in this portion of the heating chamber reaches a selected temperature the electrical contacts of the blower thermostat 26 close, causing the blower 13 to operate and the louvers 23 to open, and air is forced throughout the house. The flue gases from the furnace pass through the flue 14 to the flue duct 30 where they heat the coil 32 and the water circulating through the coil 32. The heated water passes from the coil 32 through the tube 34 to either the reservoir 31 for storage or the tubes 37 and 36 for direct use. When the house is sufficiently heated there will be an ample supply of hot water. At this point the contacts of the room thermostat 11 open and the burner 12 ceases to operate. The temperature in the heating chamber then falls and the contacts of the blower thermostat open, causing the blower 13 to cease operating and the louvers 23 to close. Closing the louvers 23 has the additional advantage of preventing overheating of the house, since heating entirely ceases when the louvers close.

In the summer, the system is the same, except that the burner 12 is controlled by the reservoir thermostat 42; the blower 13 and the motor for opening the louvers 23 are prevented from operating by a relay or other well known means, such as a hand-operated switch; and the gate 25 on the air relief duct 24 is open. The purpose of control by reservoir thermostat is to replace the room thermostat when the room is too warm to operate the room thermostat. The purpose of making blower and louver motor inoperative is to prevent heating the house when the furnace is operating. And the purpose of the air relief duct 24 is to keep the bottom part of the heating chamber 21 cool enough to avoid opening the contacts of burner thermostat 27.

I claim:

A system for heating water and also for heating a space surrounding the system, comprising a hot air furnace having a flue and having an electrically operated burner, temperature responsive means adapted to be placed in said space in control of said furnace to operate the burner when the air in the space reaches a predetermined low degree, an air duct extending upwardly from said furnace for transmitting heated air to the space, closable louvers in said duct between the furnace and the space for separating the air duct into upper and lower portions, a second duct connected with the lower portion of said air duct, and extending to the outside of the furnace, a hot water heat exchanger communicating with the flue whereby flue gases from the furnace heat the water, said heat exchanger including a water reservoir, temperature responsive means extending into the reservoir, an electric circuit to the burner including switch means controlled by the temperature responsive means for operating the burner when the temperature of the water in the reservoir reaches a predetermined low degree, said second duct having a gate therein for diverting heated air from the lower portion of the air duct to the outside of the furnace when the gate is open and the louvers closed, whereby operation of the furnace by the last named control will heat the water but will not heat the space above the louvers.

References Cited in the file of this patent

UNITED STATES PATENTS

| | | |
|---|---|---|
| 564,402 | White | July 21, 1896 |
| 796,839 | Geer | Aug. 8, 1905 |
| 1,458,876 | Confer | June 12, 1923 |
| 1,740,068 | Chadwick | Dec. 17, 1929 |
| 1,948,735 | Russo | Feb. 17, 1934 |
| 1,983,843 | Eisinga | Dec. 11, 1934 |
| 2,020,686 | Kaiser | Nov. 12, 1935 |
| 2,163,910 | Lattner | June 27, 1939 |
| 2,269,055 | Gower | Jan. 6, 1942 |
| 2,529,977 | Thomas | Nov. 14, 1950 |
| 2,533,508 | Rice | Dec. 12, 1950 |

FOREIGN PATENTS

| | | |
|---|---|---|
| 54,706 | Norway | Dec. 24, 1934 |